United States Patent [19]
Chapman

[11] Patent Number: 5,925,957
[45] Date of Patent: Jul. 20, 1999

[54] FAULT-TOLERANT MAGNETIC BEARING CONTROL SYSTEM ARCHITECTURE

[75] Inventor: John H. Chapman, Groton, Conn.

[73] Assignee: Electric Boat Corporation, Groton, Conn.

[21] Appl. No.: 08/862,816

[22] Filed: May 30, 1997

[51] Int. Cl.[6] .............................. H02K 5/24; G05B 11/32
[52] U.S. Cl. ........................ 310/90.5; 310/51; 310/68 B; 318/590; 318/591; 318/629; 318/632
[58] Field of Search ................................ 310/68 B, 90.5, 310/90, 51; 318/590, 591, 629, 565, 632, 621, 625

[56] References Cited

U.S. PATENT DOCUMENTS

| | | | |
|---|---|---|---|
| 4,090,745 | 5/1978 | Dohogne et al. | 308/10 |
| 4,910,449 | 3/1990 | Hiyama et al. | 318/640 |
| 4,912,387 | 3/1990 | Moulds, III | 318/629 |
| 4,947,067 | 8/1990 | Habermann et al. | 310/51 |
| 4,999,534 | 3/1991 | Andrianos | 310/90.5 |
| 5,003,211 | 3/1991 | Groom | 310/90.5 |
| 5,013,987 | 5/1991 | Wakui | 318/632 |
| 5,027,280 | 6/1991 | Ando et al. | 364/474.16 |
| 5,066,879 | 11/1991 | Yamamura | 310/90.5 |
| 5,084,643 | 1/1992 | Chen | 310/90.5 |
| 5,111,102 | 5/1992 | Meeks | 310/90.5 |
| 5,130,589 | 7/1992 | Kanemitsu | 310/90.5 |
| 5,155,402 | 10/1992 | Bichler | 310/90.5 |
| 5,157,296 | 10/1992 | Trumper | 310/90.5 |
| 5,160,877 | 11/1992 | Fujiwara et al. | 318/568.21 |
| 5,202,824 | 4/1993 | Chen | 364/508 |
| 5,216,308 | 6/1993 | Meeks | 310/90.5 |
| 5,294,854 | 3/1994 | Trumper | 310/90.5 |
| 5,300,841 | 4/1994 | Preston et al. | 310/90.5 |
| 5,300,843 | 4/1994 | Lyons et al. | 310/90.5 |
| 5,313,399 | 5/1994 | Beale | 364/463 |
| 5,347,190 | 9/1994 | Lewis et al. | 310/90.5 |
| 5,469,006 | 11/1995 | Pinkerton | 310/90.5 |
| 5,666,013 | 9/1997 | Mizuno | 310/90.5 |

OTHER PUBLICATIONS

Knopse et al., "Adaptive On–Line Rotor Balancing Using Digital Control", *Proceedings of MAG '93 Magnetic Bearings, Magnetic Drives and Dry Gas Seals Conference & Exhibition*, Alexandria, Virginia, Jul. 29–30, 1993, Copyright 1993 by Technomic Publishing Company, Inc.

Ku et al., "Optimum Shaft Balancing at a Rotor Bending Critical Speed with Active Magnetic Bearings", *Proceedings of MAG '93 Magnetic Bearings, Magnetic Drives and Dy Gas Seals Conference & Exhibition*, Alexandria, Virginia, Jul. 29–30, 1993 Copyright 1993 by Technomic Publishing Company, Inc.

Fedigan et al., "An Operating System for a Magnetic Bearing Digital Controller", *Proceedings of MAG '93 Magnetic Bearings, Magnetic Drives and Dry Gas Seals Conference & Exhibition*, Alexandria, Virginia, Jul. 29–30, 1993, Copyright 1993 by Technomic Publishing Company, Inc.

Kipp et al., "Control Methodology for Commercial Magnetic Bearing Systems", *Proceedings of the PCIM/Power Quality Conference*, Irvine, California, Sep. 20–24, 1992, Copyright 1992 by Interfee International, Inc.

*Primary Examiner*—Nestor Ramirez
*Assistant Examiner*—Tran N Nguyen
*Attorney, Agent, or Firm*—Baker & Botts LLP

[57] ABSTRACT

A fault-tolerant control system for a magnetic bearing arrangement which maximizes dynamic response of the control system is disclosed. The arrangement includes a main digital signal processor responsive to rotor position/velocity signals to supply control signals to bearing control coils and a secondary digital signal processor responsive to accelerometer signals to provide open-loop vibration control for correction of mass imbalance of the rotor system. In addition, sources of vibration which have fundamental frequencies at some multiple of the rotor system rotational frequency can also be controlled.

8 Claims, 4 Drawing Sheets

FAULT-TOLERANT MAGNETIC BEARING CONTROL SYSTEM ARCHITECTURE

BACKGROUND OF THE INVENTION

This invention relates to a magnetic bearing control arrangement including a closed-loop rotor position control system and a separate open loop vibration correction system. The use of multiple systems to perform separate tasks maximizes the dynamic response of the-control arrangement.

A number of papers have been published which discuss possible algorithms for implementing open-loop control methods for correcting rotor system mass imbalance in rotating devices having magnetic bearings. As described in Knopse, C. R., Hope, R. W., Fedigan, S. J. and Williams, R. D., "Adaptive On-Line Rotor Balancing Using Digital Control," *Proceedings of MAG '93 Magnetic Bearings, Magnetic Drives and Dry Gas Seals Conference & Exhibition*, Alexandria, Va., Jul. 29–30, 1993, Technomic Publishing Company, Inc. and Ku, C.-P.R. and Chen, H. M., "Optimum Shaft Balancing at a Rotor Bending Critical Speed with Active Magnetic Bearings", *Proceedings of MAG '93 Magnetic Bearings, Magnetic Drives and Dry Gas Seals Conference & Exhibition*, Alexandria, Va., Jul. 29–30, 1993, Technomic Publishing Company, these algorithms use signals acquired from vibration transducers on the support structure for the magnetic bearings, as well as the rotor position sensors used by the magnetic bearing controller for closed-loop rotor position control, to derive sinusoidal perturbation signals that are applied to both the vertical and horizontal axes of each radial bearing in the system. These sinusoidal perturbation signals generally have equal amplitude and frequency, but have a 90° phase relationship to each other and act similarly to a balance weight inserted into an imaginary balance plane at the same axial location as the radial bearing(s). Fedigan, S. J., and Williams, R. D., "An Operating System for a Magnetic Bearing Digital Controller," *Proceedings of MAG '93 Magnetic Bearings. Magnetic Drives and Dry Gas Seals Conference & Exhibition*, Alexandria, Va., Jul. 29–30, 1993, Copyright 1993 by Technomic Publishing Company, Inc. discusses real time operating systems that might allow a single digital signal processing (DSP) unit to perform the continuous task of closed-loop rotor position control for a multi-axis bearing system while still leaving time between program loops to recalculate the necessary amplitude and phase angle for the open-loop sinusoidal perturbation signals.

However, a system using two separate DSP units; one for the high priority task of closed-loop rotor position control, the second for the lower priority but computationally intensive task of recalculating amplitude and phase for sinusoidal perturbation signals, would avoid any priority conflicts and has performance advantages over a single DSP unit. This type of system, coupled with a homopolar bearing as disclosed in U.S. Pat. No. 5,111,102 to Meeks, or other bearings having redundant control coils, could also be used to implement a completely redundant magnetic bearing system/controller with both digital closed-loop rotor position control and open-loop mass imbalance correction and harmonic vibration control.

SUMMARY OF THE INVENTION

Accordingly it is an object of the invention to provide a magnetic bearing control system that incorporates closed-loop rotor position control as well as open-loop rotor system mass imbalance correction and harmonic vibration control using multiple control signal processing units to perform separate tasks so as to maximize dynamic response of the control system.

A further object of the invention is to integrate the aforementioned control system arrangement into a fault tolerant magnetic bearing system configuration where complete redundancy is provided for all components of the system up to and including the control coils and rotor position sensors in the magnetic bearings.

These and other objects of the invention are attained by providing a bearing arrangement for rotating devices utilizing a magnetic field for levitating and controlling the radial and axial positions of a rotor comprising a control unit including a closed loop rotor position controller and separate open loop vibration correction device. The closed loop rotor position unit includes one enabled closed-loop rotor position controller and one disabled closed-loop rotor position controller. The open loop vibration correction device simultaneously enables the disabled closed-loop rotor position controller and disables the enabled closed-loop rotor position controller.

BRIEF DESCRIPTION OF THE DRAWINGS

Further objects and advantages of the present invention will be more fully appreciated from a reading of the following detailed description when considered with the accompanying drawings wherein.

DESCRIPTION OF THE PREFERRED EMBODIMENT

Figure 1:
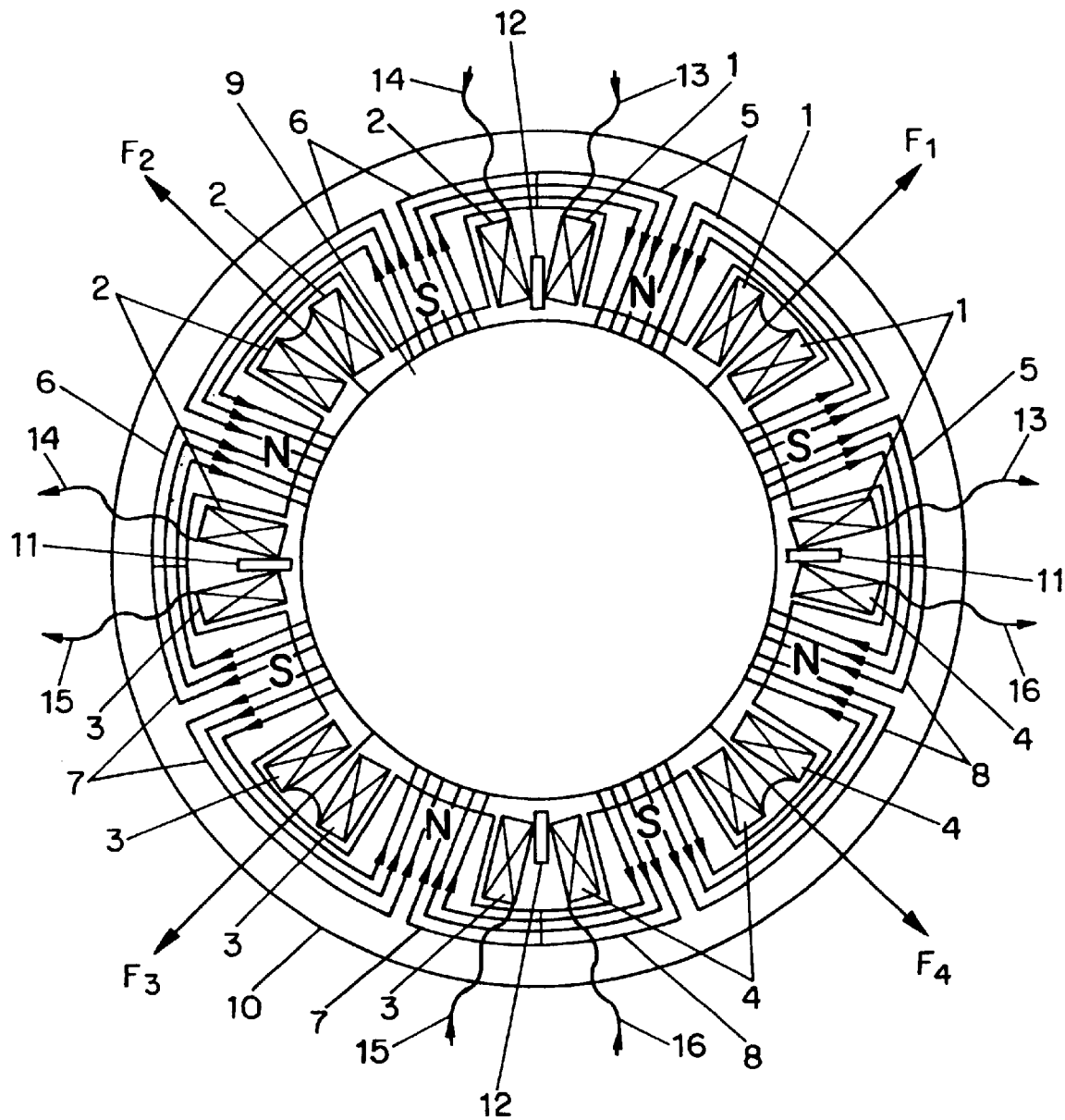
FIG. 1 is a schematic cross-sectional view illustrating a conventional radial magnetic bearing arrangement.

A conventional radial magnetic bearing configuration is shown in FIG. 1. The control coils 1, 2, 3 and 4 are used to generate magnetic flux 5, 6, 7 and 8 that couples a ferromagnetic machine rotor journal 9 and a ferromagnetic stator 10. The control coils are arranged such that each is capable of exerting a force on the rotor journal in a direction which is radially outward in their respective quadrants. The bearing also incorporates rotor position sensors 11, 12 which are typically of the inductive or capacitive type, and provide a feedback signal to a controller that generates control currents 13, 14, 15 and 16 that pass through the control coils 1, 2, 3, and 4. The magnetic flux generated by the control coils acts to bring the rotor journal to some target position. The control coils may be constructed such that two or more separate conductors are wound so as to link a common flux path influencing a given axis of the bearing. Each conductor has an independent current source and is controlled by one or more closed-loop rotor position control circuits. This allows control of a given bearing axis to be maintained even if an individual conductor in the control coil for that axis or its associated current source were to fail. This method can also be applied, in general, to other active magnetic bearing configurations, since most use control coils to vary the intensity of magnetic flux influencing the machine rotor on a given axis.

Figure 2:
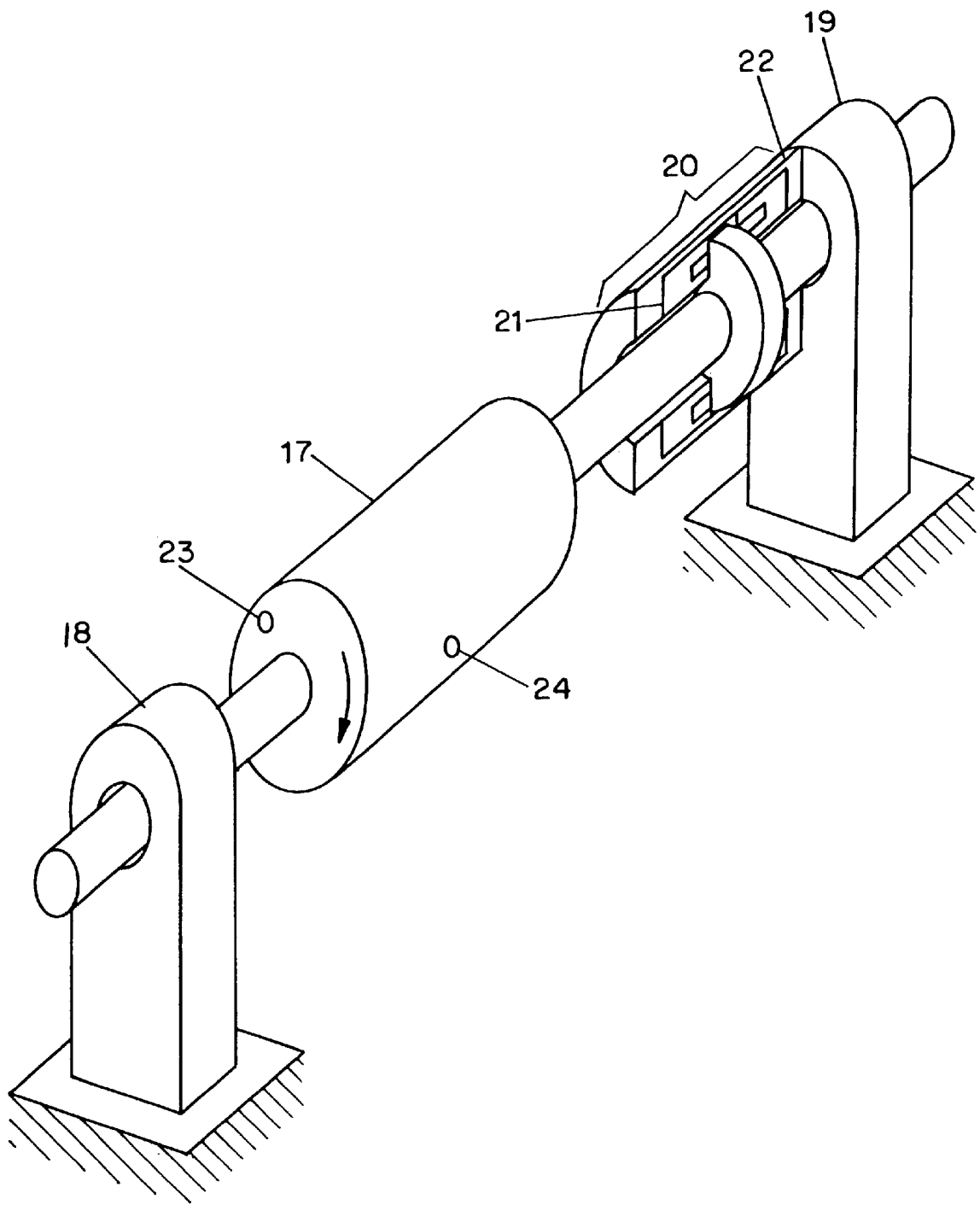
FIG. 2 is a perspective view illustrating a conventional 5-axis magnetic bearing/rotor arrangement.

A conventional 5-axis rotor system is shown in FIG. 2. The rotor system consists of the machine rotor 17, which is supported by two radial bearings 18 and 19 and constrained axially by a thrust bearing 20. The radial bearings 18, 19 each have at least two axes of control which are typically oriented 90° apart in the vertical and horizontal planes similar to the configuration shown in FIG. 1. The thrust bearing 20 consists of two opposed electromagnets 21, 22 acting on a thrust collar rigidly attached to the machine rotor. The machine rotor will typically have some degree of mass imbalance at one or more axial locations 23, 24 and may experience reaction forces that may be steady state (e.g., gravitational) or dynamic (e.g., fluid flow pulsations, electrodynamic pulsations, etc.)

Figure 3:
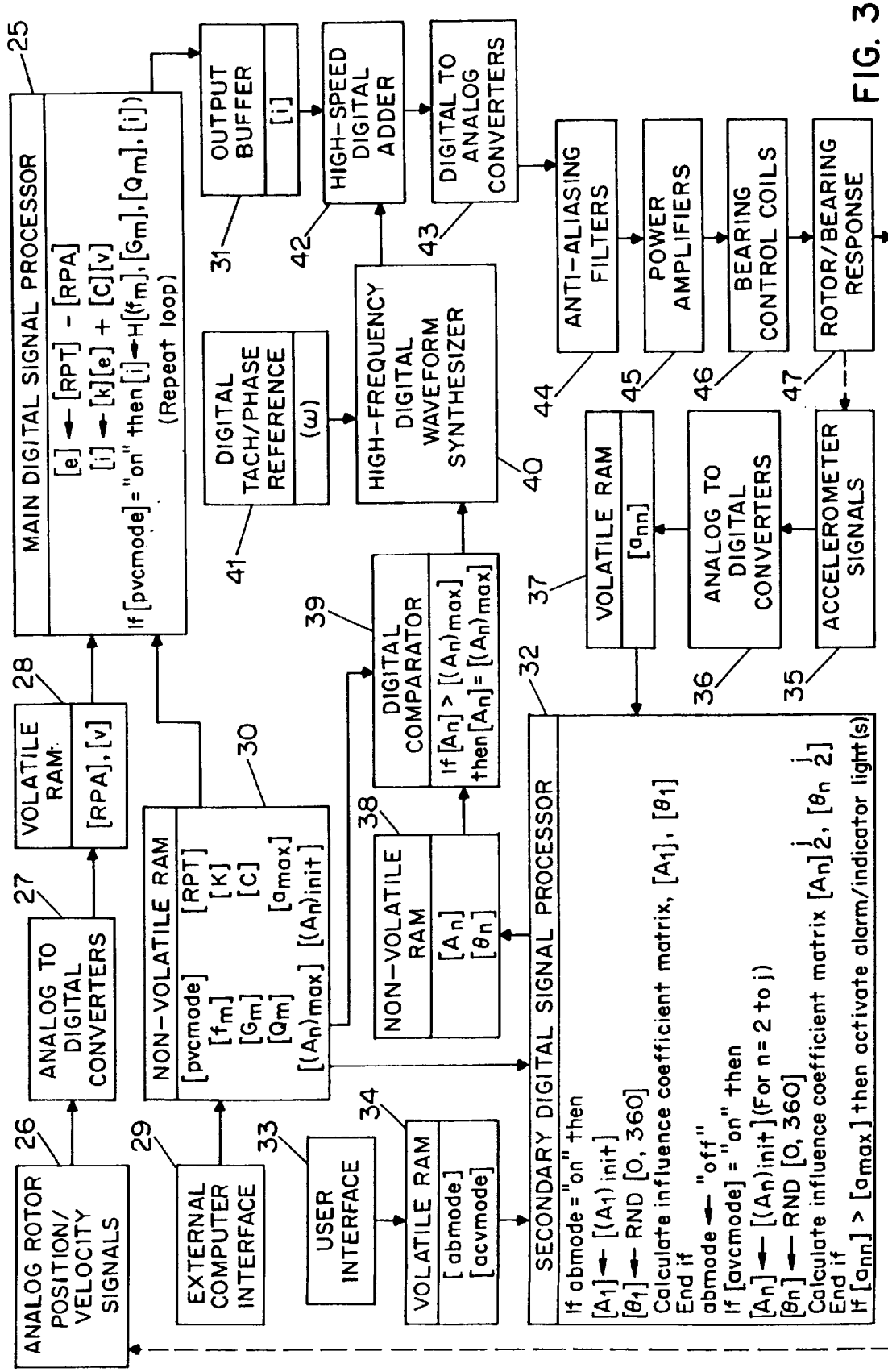
FIG. 3 is a schematic block diagram showing a representative embodiment of a digital signal processor based magnetic bearing control arrangement using both closed-loop and open-loop control in accordance with the invention.

A magnetic bearing control system architecture in accordance with the invention which incorporates both closed-loop rotor position control and open-loop control signal generation for correction of mass imbalance and other dynamic rotor loads is shown schematically in FIG. 3. While FIG. 3 illustrates an arrangement in which a DSP unit 25 is used to generate the closed-loop rotor position control signals, there are many analog controller architectures, for example, as described in Kipp, R. and Imlach, J., "Control Methodology for Commercial Magnetic Bearing Systems" *Proceedings of the PCIM/Power Quality Conference*, Irvine, Calif., Sep. 20–24, 1992, Copyright 1992 by Interfee International, Inc. that could also be used. The simplified program loop shown for the main DSP unit 25 is for illustration purposes only and as understood by those of skill in the art would likely be replaced with a much more sophisticated feed-forward linear estimator type algorithm in an actual system implementation. In the closed-loop rotor position control algorithm shown in FIG. 3 the main digital signal processor 25 is provided with a numerical array of actual rotor positions [RPA] and velocities [V] which are obtained from rotor position and velocity transducers located at each magnetic bearing axis. These transducers provide analog rotor position/velocity signals 26 which are appropriately conditioned and converted to numerical values by an analog-to-digital converter 27 and stored in the numerical arrays [RPA] and [V] which reside in a volatile RAM 28.

The main digital signal processor also uses a number of externally defined parameters to calculate the closed-loop rotor position control signals. For the illustrative system shown in FIG. 3, these parameters are entered via an external computer interface 29, e.g., a portable computer connected to the controller via a serial communication interface, and reside in a non-volatile RAM or other suitable memory device 30. The example parameters shown in FIG. 3 include an array [RPT] containing target rotor positions for each bearing axis, an array [K] containing linear stiffness coefficients for each bearing axis, an array [C] containing linear damping coefficients for each bearing axis, a logical array [pvcmode] identifying whether programmed vibration control mode is "on" or "off" for each given bearing axis, a set of two dimensional numerical arrays containing programmable notch filter parameters to be applied to control signals for bearing axes that have [pvcmode]="on" that include center frequency of the notch filter [$f_m$], filter gain [$G_m$], and filter quality or "Q-factor" [Q]. Other parameters residing in the non-volatile RAM 30 are not used by the closed-loop rotor position control section and will be discussed later herein.

The simple control algorithm shown in the program loop block for the main digital signal processor 25 starts by calculating the rotor position errors [e] by subtracting the actual rotor positions [RPA] from the target rotor positions [RPT] for all bearing axes. The rotor position errors [e] are then multiplied by the linear stiffness coefficients [k], and added to the rotor velocities [v], multiplied by the linear damping coefficients [C] to obtain the unfiltered control signals [i]. The rotor velocity [v] may be estimated from changes in [e] over previous time intervals, since [v] represents the rate of change of [e] with respect to time. Although this is a commonly used technique, obtaining rotor velocity using a dedicated velocity transducer reduces computational demands on the digital signal processor. Whether [v] is obtained by differentiating [e] or directly using a velocity transducer, the control algorithm shown in the program loop block for the main digital signal processor [25] uses a conventional proportion-integral-derivative (PID) approach, and as such, can be implemented by performing all the mathematical operations described using analog operational amplifiers. However, digital processing does permit more sophisticated mathematical operations such a non-linear and high-order polynomial type functions to be implemented without the extensive proliferation of electronic hardware and signal noise associated with analog circuitry.

As discussed earlier, it is also common practice to use a state space type algorithm to improve the accuracy of the control signal calculation being performed by the main digital signal processor 25. This is usually done by using one or more previous values of [e] and/or [v] stored in memory to perform a linear regression that can be used to extrapolate what the values of [e] and [v] will be at the time the next set of control signals [i] will be written to an output buffer 31. The time interval at which the [i] values in the output buffer 31 are updated is typically fixed so that the exact time at which the extrapolated estimates of [e] and/or [v] are needed, is known with a great deal of precision. This estimation process minimizes error introduced as the actual rotor positions and velocities at each bearing axis change over the time period from when [RPA] and [v] values are obtained to when the [i] values are calculated and written to the output buffer 31. The linear estimator approach to minimizing this error can be further improved by incorporating a simple mathematical model of the machine rotor dynamic response in place of the simple linear extrapolation. This latter method is computationally more insensitive than a linear estimator but is also commonly used and typically results in some compromise between increased computational burden on the digital signal processor and reduced error in the state space estimator.

For most digital signal processor applications, it is possible to extend the time interval at which the output buffer 31 is updated to a period long enough to perform all PID-type closed-loop rotor position control signal [i] related calculations with time left over to implement notch filtering to attenuate the [i] signal over narrow frequency ranges where excitation of resonances in the machine rotor or support structure must be avoided. For typical systems, the control signal generated for each bearing axis may require several notch filters set at various frequencies with various gains, or may not require any notch filtering at all, depending on the resonant response characteristics of the machine rotor and support structure. Therefore, the main digital signal processor 25 program loop incorporates a conditional statement that only executes the digital filter algorithm H ([$f_M$], [$G_m$], [$Q_m$], [i]) if the programmed vibration control mode status indicator [pvcmode] is set to "on" for a given bearing axis, thereby limiting computational demands on the main digital signal processor.

In addition to the closed-loop rotor position control function being performed by the main digital signal processor 25, a secondary digital signal processor 32 is incorporated in the control system to perform open-loop vibration control functions. These open-loop functions include an automatic balance mode (abmode) and an adaptive vibration control mode [avcmode] which can be activated via a user interface 33, which toggles the mode status indicators "on" or "off" in a volatile RAM area 34.

The secondary digital signal processor 32 uses signals generated by accelerometers 35 or other vibration measurement devices, that are appropriately conditioned and converted to a numerical array of values $[a_n]$ by analog-to-digital converters 36 and stored in a volatile RAM 37. The open-loop control signals are generated in the form of a numerical array of amplitudes $[A_n]$ and phase angles $[\Theta_n]$ which define sinusoidal perturbation signals that are superimposed on the closed-loop control signal [i] being generated by the main digital signal processor. These sinusoidal signals are generated independently for each bearing axis. The signal have frequencies equal to the rotational frequency of the machine rotor up to and including the nth harmonic of this frequency or have frequencies which are fractional multiples of the rotational frequency. The phase angle array $[\Theta_n]$ provides an angular reference for the sinusoidal signals at higher than rotational frequency relative to a known reference on the machine rotor with 360° corresponding to one full cycle at the harmonic frequency, i.e., one complete revolution of the machine rotor.

The $[A_n]$ and $[\Theta_n]$ values are stored in a non-volatile RAM 38. The $[A_n]$ values are then compared by a digital comparator 39 with maximum amplitude values $[(A_n)max]$ which are defined via the external computer interface 29. The $[A_n]$ values reside in the non-volatile RAM 30, and may be limited if necessary. This precludes perturbation signals of excessive amplitude from being superimposed on the closed-loop rotor position control signals. The $[A_n]$ and $[\Theta_n]$ values are then sent to a high-frequency digital waveform synthesizer 40 which uses a digital tach/phase reference 41 to produce a separate complex digitized waveform to be superimposed on the closed-loop control signal [i] for each bearing axis. The complex digitized waveforms are the sum of all the sinusoidal perturbation signals being applied to each bearing axis and are combined with closed-loop control signals [i] by a high-speed digital adder 42. The output from the adder is sent to a digital-to-analog converter 43, followed by anti-aliasing filters 44 or other signal conditioning. The conditioned analog control signals are then sent to power amplifiers 45 followed by bearing control coils 46. This results in some type of rotor/bearing response 47 that is in turn sensed via the rotor position/velocity signals 26 and the accelerometers 35.

The secondary digital signal processor can generate the amplitude $[A_n]$ and phase $[\Theta_n]$ values in a manner similar to that commonly used in conventional mechanical rotor balancing techniques. During mechanical balancing, a trial weight of known mass is placed at a known radial and angular location in a given balance plane on the machine rotor. Any suitable trial weight mass and location may be selected. This addition of a trial weight causes an angular deflection and change in amplitude of the rotational signal of the machine rotor at a given operating speed. These changes are detected by an accelerometer or other vibration detection means on one or more of the machine bearing housings or support structure. If the original imbalance of the machine rotor and the associated acceleration as measured on the bearing housing or support structure are represented by phasors $m_o$ and $a_o$, and the imbalance with the trial mass added and its associated bearing structure acceleration represented as phasors $(m_o+m_t)$ and $a_t$, then a system of two phasor equations can be written:

$$a_o = c \cdot m_o$$
$$a_t = c \cdot (m_o + m_t)$$

This system has two unknowns; $m_o$, which is the original rotor imbalance and c, which is sometimes referred to as an influence coefficient. Once the original rotor imbalance phasor $m_o$ is determined, an exact correction mass and location can be calculated to correct for the imbalance. Once the influence coefficients of each balance plane for each location of interest on the machine structure have been determined, vibration levels at any of these locations can be adjusted. This complete set of influence coefficients, each of which are phasor quantities, is generally represented in an n×k matrix where n represents the number of balance planes on the machine rotor where balance weights can be added and k represents the number of locations on the machine structure where the influence of the balance planes is determined. The values in the influence coefficient matrix are also sensitive to rotational speed since the modal response of the machine rotor and machine structure will be dependent on the frequency of the forcing function, which in mass imbalance calculations is the rotational frequency of the rotor.

This type of influence coefficient matrix, which can be considered to be a type of transfer function, can be generated for a radial magnetic bearing of the type shown in FIG. 1. By injecting a sinusoidal signal of known amplitude $(A_1)_1$, and a phase angle $(\Theta_n)$, relative to a fixed reference on the machine rotor on one control axis, e.g., the vertical axis of the bearing, and another sinusoidal signal of the same amplitude $(A_1)_2$ to the other control axis, e.g., the horizontal axis of the bearing, with a phase angle shifted 90° in the direction of rotor rotation from the sinusoidal signal sent to the first control axis, the effect of adding a balance weight at an imaginary balance plane at the plane of the bearing can be simulated. However, the magnitude of excitation is simply $A_1$, rather than the product of a trial mass and its eccentricity. Therefore, for each radial magnetic bearing, an influence coefficient can be generated for any location of interest on the machine structure. This method of generating an influence coefficient matrix may also be extended to axial bearings or even a single axis of a radial bearing. In that case only one sinusoidal perturbation signal is required, instead of two at 90° apart as described above for simultaneous excitation of a vertical and horizontal control axis.

Additionally, this method can be used to determine influence coefficients at harmonics of rotational frequency. This is useful in many types of machines such as electric motors or generators where vibration may be caused in the motor/generator frame by electrical excitation at multiples of the fundamental electrical frequency, E, such as the frequencies 2×E and 6×E. For two pole motors/generators, these correspond to twice and six times the rotational frequency of the motor. For motors or generators with more than two poles, these electrical excitations will occur at higher harmonics of the rotational frequency. Therefore, by matching the frequency of sinusoidal perturbation signals to the frequencies of these excitations which occur at other than rotational frequency of the rotor, unwanted vibration in the structure of the machine can be reduced, provided at least one bearing has sufficient influence over the location on the structure of interest.

In the arrangement shown in FIG. 3, the open-loop perturbation signals are added to the closed-loop rotor position control signal using a high speed digital adder 42. The output buffer 31 is only changed by the closed-loop rotor position control loop a few times per revolution of the machine rotor while hundreds or thousands of values from the high-frequency digital waveform synthesizer 40 may be generated during each revolution of the rotor. This allows perturbation signals to be superimposed on the closed-loop rotor control signal at harmonics that are many times the rotational frequency. Conventional magnetic bearing control systems that incorporate open-loop control features calculate and sum the perturbation signal within the closed-loop control algorithm. This limits the frequency at which open-loop perturbation signals can be injected to rotor rotational frequency, making mass imbalance and other low frequency excitation the only sources of vibration that can be acted on by open-loop signals.

Figure 4:
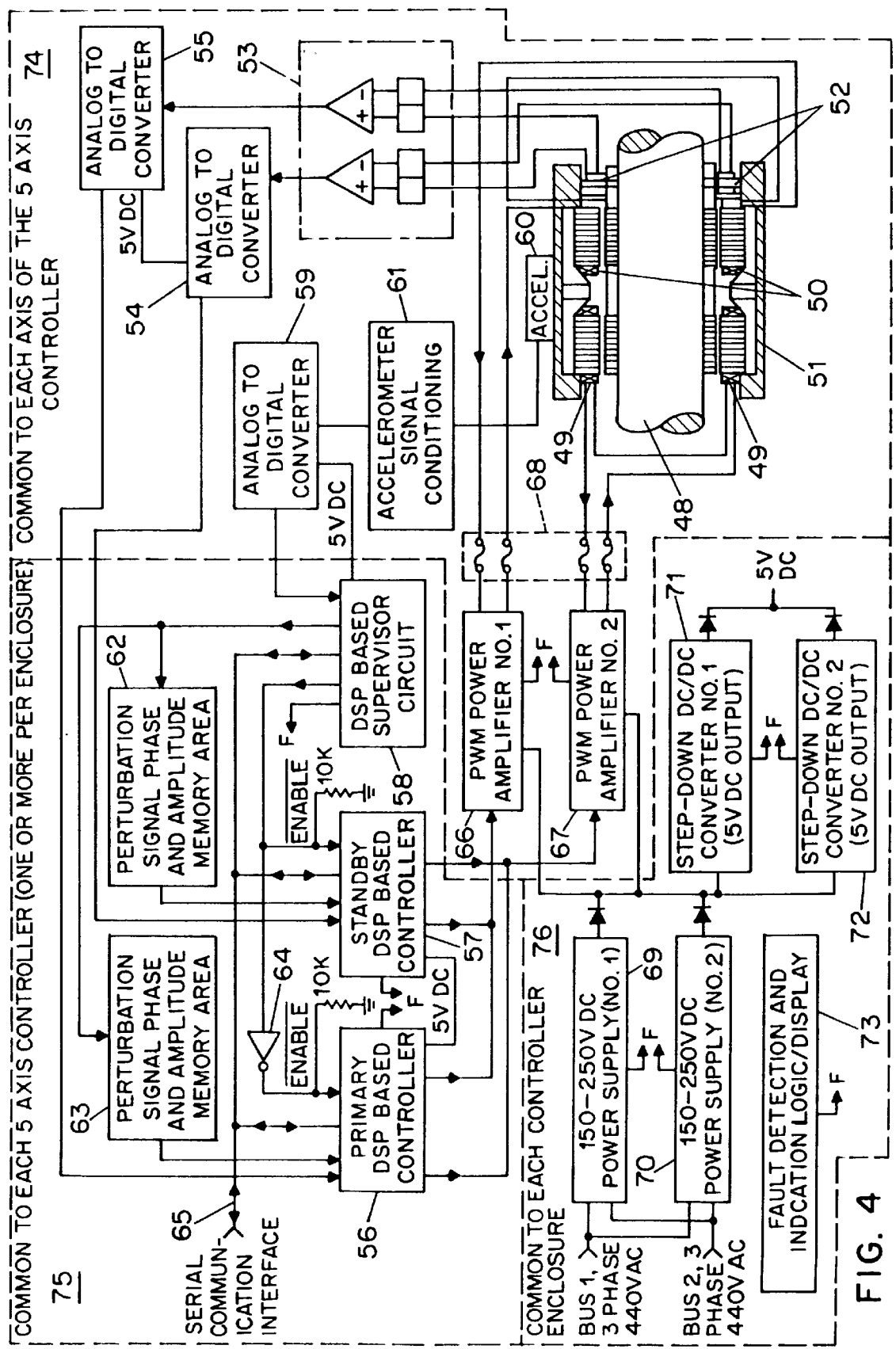
FIG. 4 is a schematic block diagram showing a representative embodiment of a fault tolerant magnetic bearing arrangement in accordance with the invention.

A magnetic bearing control system architecture that allows the closed-loop rotor position control and open-loop perturbation signal generation features shown in FIG. 3 to be implemented in a fault-tolerant configuration is shown in FIG. 4. A machine rotor 48 is shown passing through a single radial bearing of the type disclosed by Meeks in U.S. Pat. No. 5,111,102. The more conventional radial baring configuration shown in FIG. 1 may also be used. The hybrid bearing configuration shown in FIG. 4 is particularly amenable to fault-tolerant control system configurations, however, because left side and right side control coils 49 and 50 can each be sized to individually control the given bearing axis with relatively small change in the bearing dimensions for a given load rating. The bearing is equipped with dual rotor position sensors 52 on each axis, with each sensor having dedicated signal conditioning 53 and analog-to-digital converters 54 and 55. The digitized rotor position signals are then sent to primary and standby DSP based on controllers 56 and 57. The primary and standby controllers 56 and 57 are enabled or disabled by a DSP based supervisor circuit 58 which receives digitized input signals from an analog-to-digital converter 59. This analog-to-digital converter 59 digitizes vibration signals measured by an accelerometer 60 sent via a signal conditioning unit 61.

The DSP supervisor is programmed to detect excessive vibration on the bearing or support structure. If a vibration level exceeds a specified safe or desired limit, the active primary DSP based controller 56 is disabled and the inactive standby DSP based controller 57 is enabled. Using vibration level as an independent parameter to detect a malfunctioning controller and implementing logic which prevents more than one controller from being active at a time, e.g., an inverter 64, ensures that a malfunctioning controller will not generate control signals which interfere with the back-up controller. Other ways of isolating a malfunctioning or inactive standby controller, such as output isolation, may also be used.

The DSP based supervisor 58 is also programmed to use the digitized vibration signals from the accelerometer 60 to generate open-loop perturbation signals which are stored in memory areas 62 and 63. These memory areas are analogous to the non-volatile RAM 38 shown in FIG. 3. The DSP based controllers 56 and 57 each incorporate all of the features shown on FIG. 3 required for closed-loop rotor position control. In addition each of the DSP based controllers has a digital comparator 39, high-frequency digital waveform synthesizer 40, digital tachometer/phase reference 41, and the high speed digital adder 42. This allows either DSP based controller to maintain open-loop control functions should the other malfunction. A serial communication interface 65 allows the various parameters in the non-volatile RAM 30 shown in FIG. 3 to be loaded into each DSP based controller 56 and 57.

Two pulse-width modulated (PWM) amplifiers 66, 67 can receive control signals from either DSP based controller 56 or 57. The PWM Power Amplifier 66 drives the right side control coils 50 while the left side coils 49 are driven by the PWM Power Amplifier 67. Each amplifier drives through fuses or other passive overcurrent protection devices 68.

Redundancy in the power supply section is provided by incorporating two independent DC power supplies 69 and 70 driving through diodes so that if one unit fails, DC power to the circuit is maintained. A similar configuration is used for two logic level, e.g., 5 VDC power supplies 71 and 72. The main power supplies 69 and 70 are each connected to independent buses, BUS 1 and BUS 2, to provide further redundancy. The DSP based controllers 56 and 57, DSP based supervisor 58, PWM power amplifiers 66 and 67, DC power supplies 69 and 70, and logic level power supplies 71 and 72 each incorporate fault indication outputs F which are fed into a fault detection and indication logic/display 73, which is simply a set of lights or other type of enunciator that indicates when a particular portion of the system has suffered a fault.

The arrangement shown in FIG. 4 would typically be used to operate a large number of bearings, each having the features shown in the boundary labeled "common to each axis of the 5 axis controller (74)". As recognized by those skilled in the art the arrangement can be used to operate different bearing configurations as well. A rotor system, such as that shown in FIG. 2, typically has 5 axes, consisting of two radial bearings, each having a vertical and horizontal control axis, and a thrust bearing which controls the axial position of the rotor. Rotor systems and magnetic bearing system controllers may also be designed which have fewer or a greater number of axes. Each 5-axis controller contains the features shown in FIG. 4 within the boundaries labeled "common to each 5-axis controller (one or more per enclosure) (75)." The 5-axis controller may be installed in an enclosure along with four power supplies 69, 70, 71 and 72 and a fault indication unit 73 shown in FIG. 4 within the boundaries labeled "common to each controller enclosure (76)."

Although the invention has been described herein with reference to specific embodiments, many modifications and variations will readily occur to those skilled in the art. Accordingly, all such variations and modifications are included within the intended scope of the invention.

I claim:

1. A bearing arrangement for devices comprising rotating and stationary members utilizing a magnetic field for levitating and controlling the positions of the rotating members along axes which include the axis of rotation and axes orthogonal thereto comprising control means including closed loop rotor position controller means comprising a first signal processing means and separate vibration sensing means comprising a second signal processing means which generates an open loop perturbation signal wherein the closed loop rotor position means includes one enabled closed-loop rotor position controller means and one disabled closed-loop rotor position controller means and the vibration sensing means simultaneously enables the disabled closed-loop rotor position controller means and disables the enabled closed-loop rotor position controller means if vibration sensed by the vibration sensing means exceeds a predetermined level.

2. A bearing arrangement in accordance with claim 1 further comprising at least one independent rotor position sensor for each axis dedicated to the one enabled closed-loop rotor position controller means and at least one independent rotor position sensor for each axis dedicated to each of the one disabled closed-loop rotor position controller means.

3. A bearing arrangement in accordance with claim 1 further comprising at least two independent power amplification means for receiving input signals dedicated to each of the one enabled closed-loop rotor position controller means and one disabled closed-loop rotor position controller means.

4. A bearing arrangement in accordance with claim 3 further comprising a control coil dedicated to each power amplification means for receiving current from each power amplification means and controlling the bearing along an axis of the bearing.

5. A bearing arrangement for rotating devices in accordance with claim 1 wherein the one enabled closed-loop rotor position controller means generates a control signal, and comprising means for summing both the open-loop perturbation signal and the control signal for use in attenuating vibration of the stationary members.

6. A bearing arrangement for rotating devices in accordance with claim 5 wherein the vibration sensing means includes a dedicated high frequency waveform synthesizer for generating an open-loop perturbation signal and the means for summing includes a high-speed summation device.

7. A bearing arrangement for rotating devices in accordance with claim 6 wherein the vibration sensing means includes means for generating the perturbation signal by applying arbitrary perturbation signals of known amplitudes, phase and frequency content relative to a rotating reference point located on the rotating members on at least one axis, means for calculating an influence coefficient matrix based on changes in vibration levels measured by the vibration sensing means, and means for calculating the amplitude, phase and frequency content of a perturbation signal that minimizes vibration measured by the vibration sensing means using the influence coefficient matrix.

8. A bearing arrangement as in claim 6 further comprising at least one attenuation means which decreases the amplitude of at least one rotor position signal sensed by the closed-loop position controller by a programmable gain at a programmable center frequency with a programmable filter quality.

* * * * *